United States Patent [19]
Numbers

[11] 3,942,864
[45] Mar. 9, 1976

[54] LENS CAP FOR OPTICAL INSTRUMENTS WITH PIVOTALLY MOUNTED LENS COVER

[76] Inventor: Jody L. Numbers, 2212 S. Priest, Tempe, Ariz. 85282

[22] Filed: Oct. 15, 1974

[21] Appl. No.: 514,589

[52] U.S. Cl................................. 350/65; 220/335
[51] Int. Cl.².......................................... G03B 11/04
[58] Field of Search .......... 350/65, 61, 318; 33/244; 220/323, 335; 339/44 R

[56] References Cited
UNITED STATES PATENTS

| | | | |
|---|---|---|---|
| 849,409 | 4/1907 | Martin | 350/57 |
| 1,427,592 | 8/1922 | Hales | 350/65 |
| 2,807,355 | 9/1957 | Shiffman | 220/335 |
| 2,849,795 | 9/1958 | Vissing | 350/65 |
| 2,889,629 | 6/1959 | Darkenwald | 350/65 |
| 3,015,982 | 1/1962 | Bing et al. | 350/58 |
| 3,758,200 | 9/1973 | Saito | 350/318 |
| 3,831,285 | 8/1974 | Vissing | 350/65 |
| 3,840,883 | 10/1974 | Choate | 350/58 |

Primary Examiner—Ronald J. Stern
Assistant Examiner—Jon W. Henry
Attorney, Agent, or Firm—Warren F. B. Lindsley

[57] ABSTRACT

A threadedly mounted cap for the lens opening of optical instruments such as cameras with a pivotally mounted lens cap mounted thereon spring biased to open and closed positions when pivotally moved beyond a given point.

2 Claims, 6 Drawing Figures

U.S. Patent  March 9, 1976  3,942,864
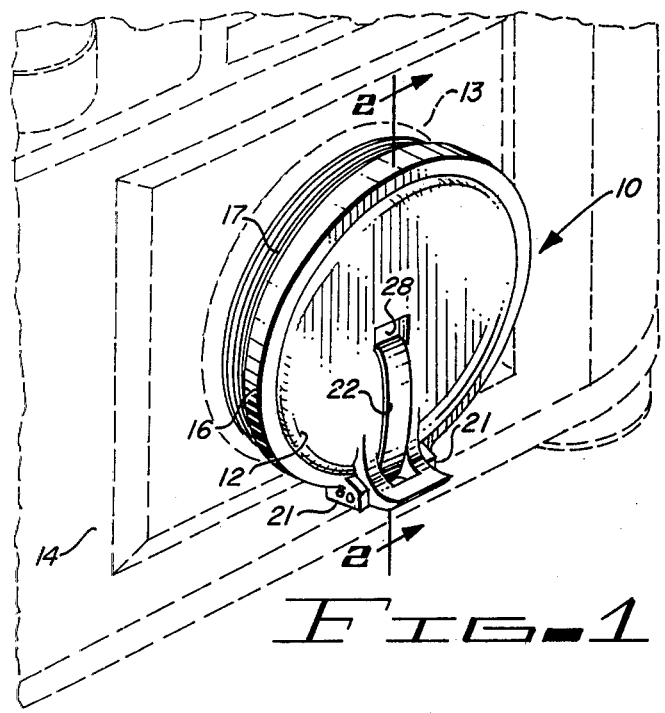
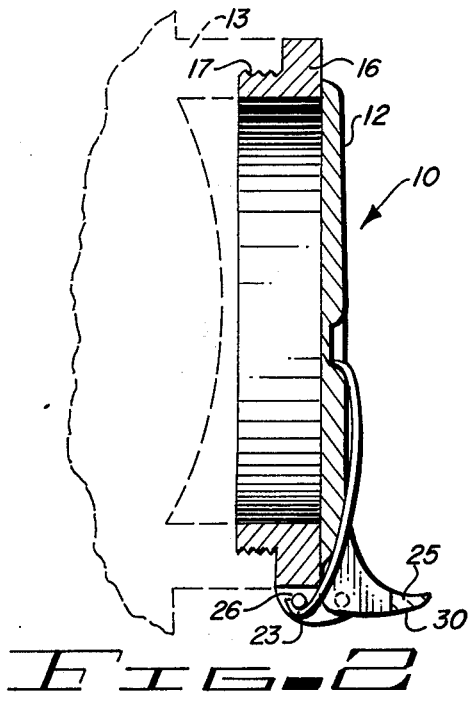
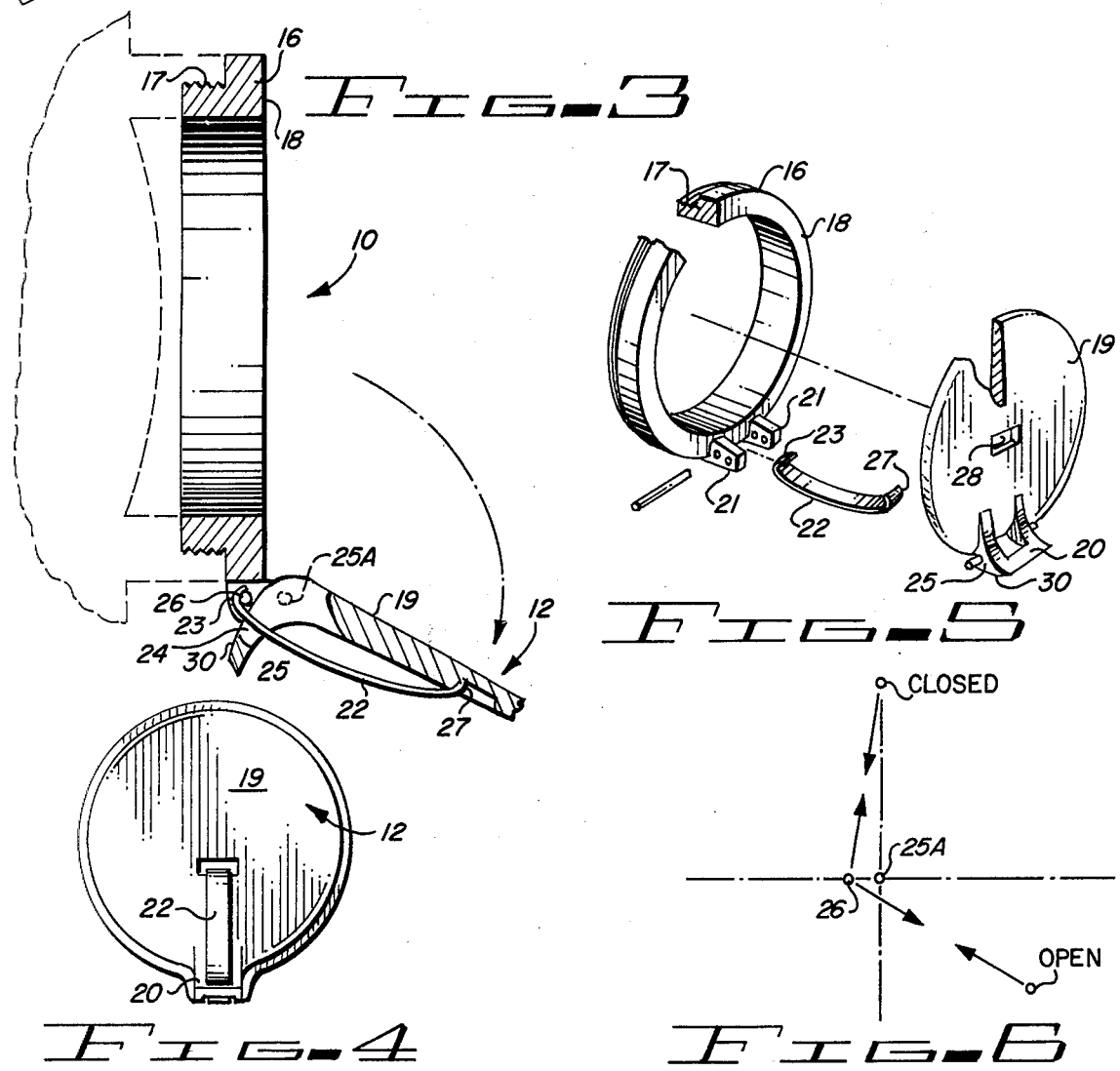
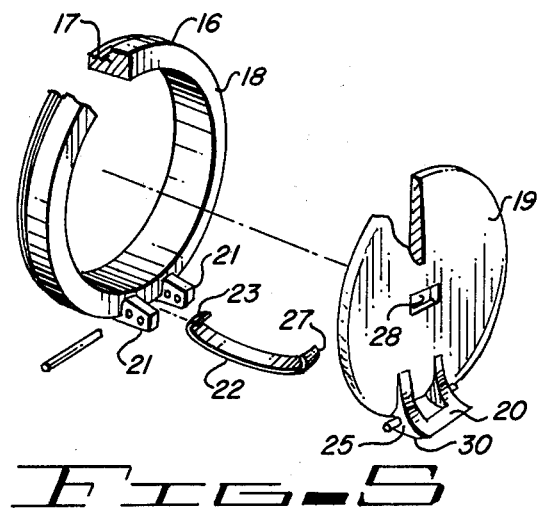
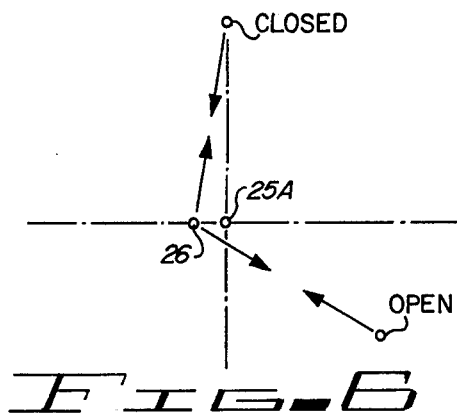

LENS CAP FOR OPTICAL INSTRUMENTS WITH PIVOTALLY MOUNTED LENS COVER

BACKGROUND OF THE INVENTION

This invention relates to an improved lens cap threadedly mountable in the lens opening of a camera for protecting the lens of the camera when the camera is not in use and employing a lens cap which is pivotally mounted for movement between lens covering and lens exposing positions by a lever extending outside of the outer periphery of the cap which is spring biased to hold the cap open when moved beyond a predetermined position in one direction and spring biased to hold the cap closed when moved beyond said predetermined position in another direction.

DESCRIPTION OF THE PRIOR ART

Lens caps have been used for years for protecting the lens of a camera from dust while the camera is not in use and some structures have combined the sunshade and lens cap features, such as those shown in U.S. Pat. Nos. 1,775,180 and 3,715,149. Although these prior art structures eliminated the time spent in removing the lens cap from the lens opening, none of them have achieved their functions with a simple integrated structure formed of a few parts which may be inexpensively manufactured, easily assembled and quickly utilized. An inexpensive product easily threadedly mountable on most cameras is disclosed herein for use by the public rather than only by the professional who could afford the prior art hardware offering these features.

SUMMARY OF THE INVENTION

In accordance with the invention claimed, an improved lens cap having a pivotally mounted cover is provided which is made from a few easily assembled parts and easily threadedly mounted on the lens mount of most cameras. The lens cap may be a cylindrically shaped flange for threaded attachment to the lens mount employing a spring biased lens cover pivotally mounted at a point on its outer periphery adjacent the lens. The lens cover pivotally moves from a spring biased lens protective position to a spring biased lens exposing position by a hand actuated lever mounted on the outside periphery of the lens cover.

It is, therefore, one object of this invention to provide a new and improved lens cap configuration for optical instruments.

Another object of this invention is to provide a lens cap for mounting on a lens mount of a camera having a pivotally mounted lens cover attached thereto for movement from a spring biased lens covering position to a spring biased lens exposure position.

A further object of this invention is to provide a lens cap for attachment to a lens mount having a dual acting pivotally mounted spring biased lens cover mounted therein.

A still further object of this invention is to provide an improved inexpensive lens cap configuration for cameras which is easy to fabricate, assemble and mount on or remove from a camera.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

FIG. 1 is a perspective view of a lens cap applied to the lens mount of a camera with the components of the lens cap in closed position and embodying the invention.

FIG. 2 is a cross-sectional view of FIG. 1 taken along the line 2—2.

FIG. 3 is a cross-sectional view similar to FIG. 2 with the lens cover in open position.

FIG. 4 is a front elevational view of the device shown in FIG. 1 with the lens cover of the lens cap in closed position.

FIG. 5 is a partial exploded view of the lens cap and lens cover showing details of the pivotal connection of the lens cover to the lens cap.

FIG. 6 is a diagrammatic view of the lens cap shown in FIGS. 2 and 3 with reference to its pivot point and fixed spring mounting in both positions.

DESCRIPTION OF THE PREFERRED EMBODIMENT

Referring more particularly to the drawing by characters of reference, FIGS. 1–4 disclose a lens cap 10 employing a pivotally mounted spring biased lens cover 12 which is threadedly mounted to the lens mount 13 of a camera 14. The lens cap comprises a cylindrical flange like configuration 16 the outer surface of one end being provided with threads 17 for interengaging the threads of the lens mount of camera 14. The other end of the cylindrical configuration is provided with a circular flange or shoulder 18 to provide a seat for lens cover 12.

Lens cover 12 comprises a disc 19 shaped to cover the opening in cylindrical portion 16 and to seat against the flat surface of shoulder 18 as shown in FIG. 2.

As shown in FIG. 5, disc 19 is provided with a T-shaped protrusion 20 extending from its periphery which serves as the pivotally mounting means of the lens cover with the lens cap. The cross arm of the T-shaped protrusion is arranged to fit within bearings 21 on shoulder 18 of the hood and the lens cover is maintained open or closed by a suitable spring 22.

Spring 22, as shown in FIGS. 2 and 3, may have an arcuate shaped configuration having one end 23 fitted into a groove 24 in a lever arm 25 pivotally mounted at 25A on the outer periphery of disc 19 and forming a part thereof. As noted, the extremity of end 23 is fitted around and anchored to a pin 26 positioned on the outside periphery of the lens cap. The sides of groove 24 form limits for the deflection of the spring in its lens cover open and closed positions. The other end 27 of spring 22 is fittedly biased into suitable opening in the periphery of a slot 28 formed in the outer surface of disc 19 of the lens cover and arranged to extend longitudinally of the disc.

As noted from FIG. 2 of the drawing, spring 22 may be an over center spring arranged to bias the lens cap in either open or closed direction. In FIG. 2 spring 22 is shown biasing the lens cover to its closed position and in FIG. 3 to its open position. Lever arm 25 forming a part of the disc 19 is pivotally mounted on the outside periphery of the lens cap 10 to hold lens cover 12 in its closed position and by clockwise rotation of this latch, as shown, the lens cover will be released and the cover will move under the bias of spring 22 to its open position shown in FIG. 3. The cap may then be pushed back to its lens closed position shown in FIG. 2 by finger pressure applied to the knurled surface 30 at the end of lever arm 25.

It should be recognized that spring 22 may be arranged to bias when in an over center position lens cover 12 to its closed position shown in FIG. 2 and in that instance the end of lever arm 25 will be rotated counterclockwise to close the lens cap.

FIG. 6 illustrates diagrammatically the relative positions of the lens cover in its open and closed position with reference to its pivot point.

As noted from the drawing and the description above, a quick acting lens cover is pivotally mounted in a tubular lens cap threadly attached to the lens mount of an optical instrument such as a camera. This device may be formed of plastic parts economically manufactured and assembled to provide a positive acting locked open or closed lens cap mounted in a suitable hood or sunshade.

Although but one embodiment of the present invention has been illustrated and described, it will be apparent to those skilled in the art that various changes and modifications may be made therein without departing from the spirit of the invention or from the scope of the appended claims.

What is claimed is:

1. A lens cap for mounting on the lens mount of a camera comprising:

a tubular cylindrical member for attaching at one end on the front end of the lens mount of the camera, said one end being threaded for engaging mating threads on the lens mount, said cylindrical member defining a ledge at its other end around its periphery forming a lens cover seating surface, a lens cover pivotally mounted on the outside periphery of said cylindrical member and comprising a substantially flat disc for covering in one position the camera lens, the periphery of said disc engaging said seating surface in lens cap closed position, said disc having a protrusion extending from its peripheral edge for interfitting with a receiving member on the periphery of said cylindrical member to provide the pivotal mounting of said lens cover, and spring means extending between said lens cover and said cylindrical member for biasing said disc to one of its lens open and lens closed positions, said spring means comprising an arcuate shaped spring, one end being attached to the periphery of said member and its other end being connected to said disc, said lens cover being provided with a lever arm extending outwardly from its periphery, whereby said lens cover may be pivotally moved by the user applying finger pressure on said lever arm against the biasing action of said spring to pivotally move said lens cap, said lever arm defining a slot, and one end of said spring means extending through said slot of said lever arm to said cylindrical member, whereby said spring means is retained and the amount of its deflection is controlled by the sides of said slot when said lens cover is moved to open and closed positions.

2. The lens cap set forth in claim 1 wherein:

said disc is provided with a slot for receiving and pivotally mounting one end of said arcuate shaped spring.

* * * * *